Figure 1:
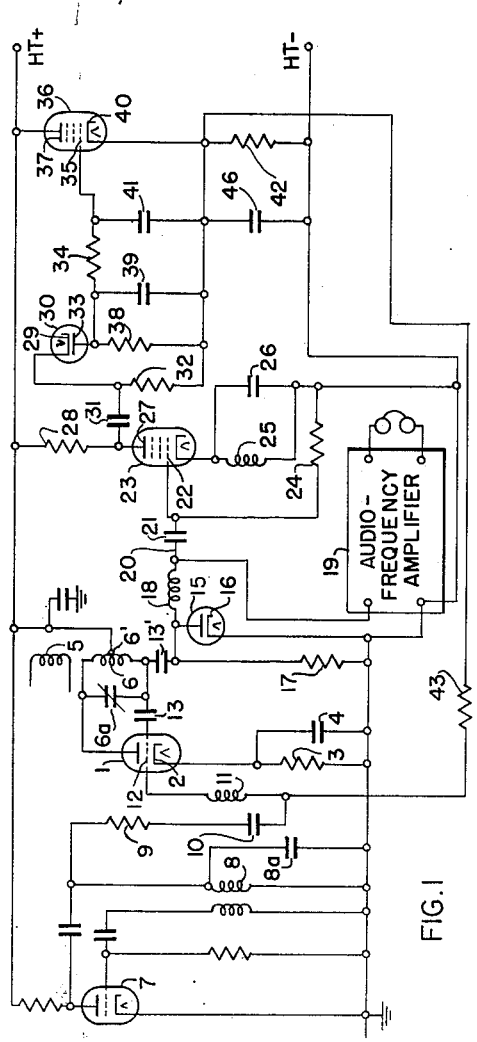

Nov. 4, 1952  H. WOOD ET AL  2,617,020
SUPERREGENERATIVE TYPE OF WAVE-SIGNAL TRANSLATING SYSTEM
Filed July 22, 1947  2 SHEETS—SHEET 1

INVENTOR.
HUBERT WOOD
FREDERIC C. WILLIAMS
BY   JAMES R. WHITEHEAD

ATTORNEY

Nov. 4, 1952  H. WOOD ET AL  2,617,020
SUPERREGENERATIVE TYPE OF WAVE-SIGNAL TRANSLATING SYSTEM
Filed July 22, 1947  2 SHEETS—SHEET 2

INVENTORS
HUBERT WOOD
FREDERIC C. WILLIAMS
JAMES R. WHITEHEAD
BY
John P. Harvey
ATTORNEY Patented Nov. 4, 1952

2,617,020

UNITED STATES PATENT OFFICE 2,617,020

SUPERREGENERATIVE TYPE OF WAVE-SIGNAL TRANSLATING SYSTEM

Hubert Wood, Hollinwood, and Frederic C. Williams and James Rennie Whitehead, Millbank, London, England, assignors to Ferranti Limited, Hollinwood, England, a corporation of Great Britain Application July 22, 1947, Serial No. 762,730
In Great Britain March 15, 1945

Section 1, Public Law 690, August 8, 1946
Patent expires March 15, 1965

8 Claims. (Cl. 250—20)

This invention relates to wave-signal translating systems of the superregenerative type and more particularly to such systems embodying means for maintaining an operating characteristic, such as the sensitivity, of the superregenerative system at a substantially constant and chosen level. While the invention is subject to a wide variety of applications, it is especially useful in superregenerative radio receivers and will be particularly described in that connection.

Superregenerative receivers are well known to be critical in their adjustment to a condition providing sensitive but stable reception since the sensitivity varies widely with changes in such factors as the input recceiving frequency, the degree of aerial or other input loading and the various necessary supply voltages. Furthermore the behavior of one receiver may be markedly different from that of another and superficially identical receiver due to quite minor variation of component values between such receivers.

Broadly, the sensitivity of a superregenerative amplifier circuit is governed by the degree of regeneration provided. The amount of regeneration necessary and the amount actually provided within the circuit may both vary with changes in any of the factors mentioned above.

In common with all radio receiver circuits employing thermionic valves, superregenerative valve circuits, when in a sensitive condition, provide an output containing random voltage fluctuations due, principally, to thermal agitation "noise." These fluctuations, which cover a wide band of frequencies and which have varying amplitudes, will hereinafter be referred to as the "noise" voltage fluctuations. In a superregenerative valve circuit, in which amplification is allowed to occur during a part only of the period of each cycle of the quenching oscillation, these noise voltages can build up only during such periods and in consequence the circuit output, ignoring any received signal input, comprises noise-voltage fluctuations having a strong oscillatory component occurring at the frequency of the quenching oscillation and a large number of weaker oscillatory components spread out in frequency over the whole of the pass band of the circuit.

The mean amplitude of the noise voltages increases with an increase of the sensitivity of the receiver and it has already been proposed to make use of this property for automatically maintaining the sensitivity of a superregenerative valve circuit at or near a chosen value in spite of variations in any of the factors previously mentioned. In such prior proposals the noise voltages in the superregenerative circuit are fed, after rectification, to an amplifier tuned to the frequency of the quenching oscillation, the oscillatory output from such amplifier being then rectified to produce a direct-current voltage which is fed to the superregenerative valve in such a manner that any tendency towards alteration of the general level of noise oscillation in the output circuit of such valve is resisted or eliminated.

The prior proposals above referred to are directed principally to the reception of pulse-modulated signals and under such conditions satisfactory maintenance of sensitivity may usually be obtained. In the presence, however, of a continuous carrier-wave signal input (either modulated or unmodulated), the signal applied from the supperregenerative circuit to the following rectifier is necessarily strongly modulated at the quenching frequency and results in a rectified output which has a strong quench-frequency component. The following amplifier, to which the oscillatory components of such detector output are fed, is thus provided with two inputs, (a) that due to the noise voltages always present and (b) that due to the input signal. Both inputs have strong quench-frequency components which are accepted by the amplifier. Since input (b) may clearly be much larger than (a) and also additional thereto, the resultant direct-current voltage eventually available for control of the superregenerative valve is no longer related to the noise-voltage level and may cause a substantial reduction of the receiver sensitivity. This effect renders arrangements according to the prior proposals susceptible to jamming by continuous wave transmission due to the resultant reduction of the receiver gain to other wanted signals at nearby frequencies.

It is an object of the invention, therefore, to provide a wave-signal translating system having an improved arrangement which substantially avoids the aforementioned limitation of prior arrangements for controlling an operating characteristic, such as the sensitivity, of the system.

The main object of the present invention is to provide a superregenerative radio receiver with improved means for maintaining constant or nearly constant sensitivity as one or more factors, such as those previously mentioned, alter.

A further object of the invention is to provide an arrangement in which the reduction of sensitivity due to an applied carrier-wave signal is diminished.

As is well known, arrangements have previously been proposed for effecting automatic control of the over-all amplification or gain of both superheterodyne and superregenerative type receivers whereby a substantially constant value of output signal is obtained with widely varying values of signal input. Such arrangements involve wide variation of the receiver sensitivity, in the presence of and under the control of the input signal. The present invention is distinguished from such arrangements by having as its object, not the maintenance of a constant value of output signal but on the contrary, the maintenance of a substantially constant value of sensitivity in a superregenerative receiver in either the presence or absence of any input signals.

According to one feature of the present invention the noise-voltage fluctuations present in a superregenerative wave-signal translating system, other than those occurring at or near the quenching oscillation frequency, are utilized to provide a potential for controlling means for varying the amount of regeneration in such manner as to maintain the system in a condition of constant or nearly constant sensitivity.

According to a particular aspect of the invention the noise-voltage fluctuations present in the superregenerative valve output of a radio receiver are fed, either directly or indirectly, to an amplifier adapted to attenuate or reject the quenching frequency component of the noise-voltage fluctuations, after which the remaining amplified noise fluctuations are fed to a rectifier, the unidirectional output of which is used to control the amount of regeneration in the radio receiver.

Preferably the output of the superregenerative circuit is first rectified before application to the amplifier valve. Such rectifier conveniently consists of the normal detector by which the required signal modulation is derived for subsequent use. The amplifier is conveniently of the degenerative feed-back type, for instance, one having a resonant rejector circuit, tuned to the quenching frequency, in its cathode lead.

For a better understanding of the present invention, together with other and further objects thereof, reference is had to the following description taken in connection with the accompanying drawings, and its scope will be pointed out in the appended claims.

Figure 4:
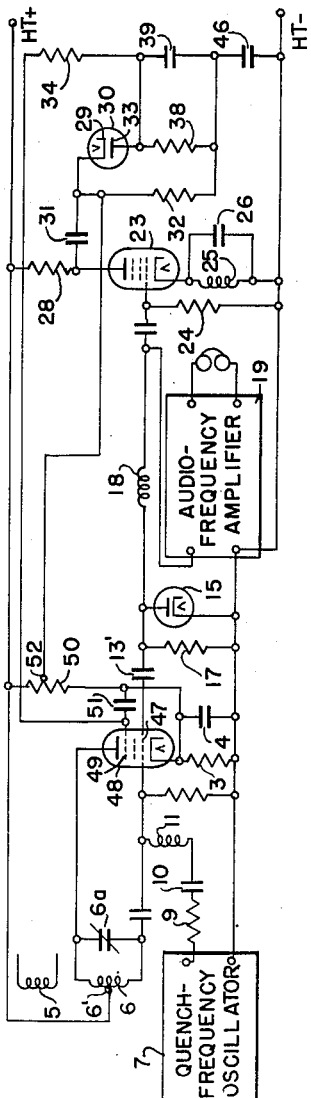
Figure 2:
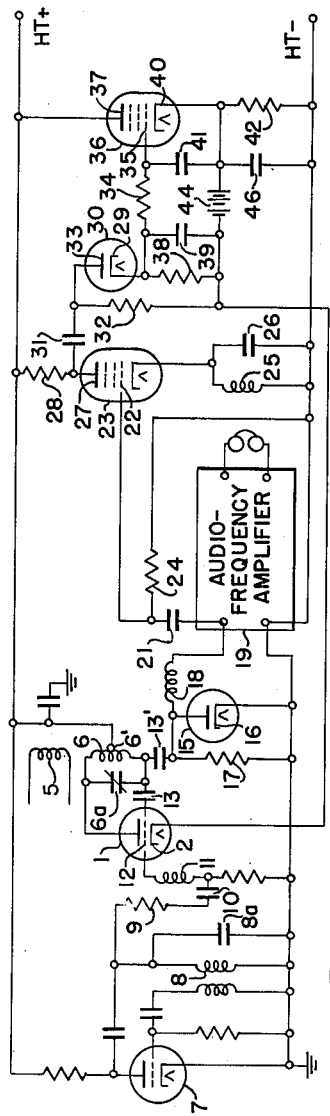
Figure 3:
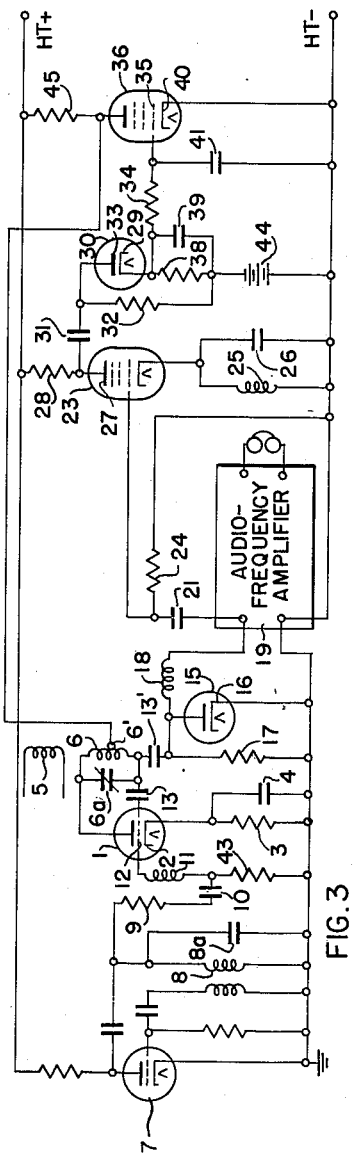

Figs. 1 and 4 show two different circuit arrangements of a superregenerative receiver embodying the invention, while Figs. 2 and 3 show alternative modifications of part of the circuit shown in Fig. 1.

Referring first to Fig. 1, there is represented an application of the invention to a superregenerative radio receiver for use in a mobile craft, such as an airplane, for the reception of signals over a wide range of frequencies. This receiver includes a superregenerative amplifier stage comprising a triode valve 1 arranged in a Hartley-type oscillator circuit, having an inductor 6 shunted by a variable condenser 6a for tuning over the required range of receiving frequencies and connected between the anode and control grid of the valve by way of condenser 13. A space-current source, designated HT+, is connected by way of a mid-point tap 6' of the inductor. Coil 5, coupled to inductor 6, serves to apply the input signals received by an aerial, not shown, to the tuned circuit. The cathode 2 of valve 1 is connected by way of a biasing resistor 3, shunted by a decoupling condenser 4, to the earthed HT— supply line.

The necessary quenching oscillations are supplied by a triode valve 7 arranged as a conventional inductive feed-back oscillator, the quenching frequency being determined by the constants of the parallel circuit provided by an inductor 8 and a condenser 8a. The quench oscillations are applied to control grid 12 of valve 1 from the high potential end of the circuit 8, 8a by way of a resistor 9, a blocking condenser 10 and a radio-frequency choke coil 11.

The grid-connected end of tuned circuit 6, 6a is connected by way of a condenser 13' to the anode of a diode valve 15 the cathode 16 of which is directly connected to the earthed HT— line. This diode valve is shunted by a load resistor 17. The rectified signal voltages developed across resistor 17 are applied by way of a radio-frequency choke coil 18 to an audio-frequency amplifier means, indicated schematically at 19, and the output from the latter is used to operate any desired device, such as a telephone receiver.

The voltages developed across load resistor 17 are also applied by way of a lead 20 and a condenser 21 to the control grid 22 of a pentode amplifier valve 23. This valve, which has its screen and suppressor grids connected in the conventional manner (not shown) for an amplifier, has its cathode connected to the earthed HT— supply line by way of a tuned rejector circuit comprising an inductor 25 and a condenser 26. This circuit is arranged to be resonant at the frequency of the quenching oscillations generated by valve 7. A grid leak 24 completes a direct-current grid-to-cathode path for valve 23.

An anode load resistor 28 is connected between the anode 27 of valve 23 and the HT+ supply line. The amplified voltages developed across this resistor are applied by way of a condenser 31 to the cathode 29 of another diode valve 30 whose anode 33 is connected by way of a load resistor 38 to the cathode 40 of a further pentode valve 36. A leak resistor 32 is connected between cathode 29 of diode valve 30 and the cathode-connected end of resistor 38.

The load resistor 38 is shunted by a condenser 39 and the rectified voltages developed across this circuit are applied between the control grid 35 and cathode 40 of valve 36 by the connection of anode 33 of diode 30 to the control grid 35 through a resistor 34. A further condenser 41 is connected between control grid 35 and cathode 40 of valve 36.

Anode 37 of valve 36 is directly connected to the HT+ supply line and its cathode 40 is connected to the earthed HT— supply by way of a cathode load resistor 42 which is shunted by a condenser 46. The voltages developed across this load circuit are applied to the control grid 12 of the superregenerative valve 1 by a connection from cathode 40 through a resistor 43 to the junction between blocking condenser 10 and choke coil 11.

The operation of the arrangement is as follows. Valve 1 and its associated quenching valve 7 operate in the manner normal to a superregenerative type of circuit, the oscillating condition of the valve 1 being periodically suspended at the quenching oscillation frequency by virtue of the oscillations applied to the control grid 12 from valve 7. As such, the circuit is subject to the various and well-known variable factors, such as change of frequency of the tuned circuit 6, 6a, alteration of aerial loading by way of coil 5 and variation of HT and cathode heating supplies, which tend to disturb the notoriously critical adjustments of the various circuit elements essential to give reliable and sensitive reception. Now, in the absence of any received signal, periods of radio-frequency oscillation due to the superregenerative amplification of the random noise-voltage fluctuations occur in the circuit of valve 1. These periods of oscillation are recurrent at the quenching oscillation frequency.

Upon rectification by the circuit including diode valve 15 there is developed across load resistor 17 a fluctuating output voltage comprising components at all frequencies within the pass band of the circuit with a strong component at the quenching frequency, the amplitude variation of these components being variable in accordance with the random noise-voltage fluctuations in the circuit of valve 1.

These output components, which in normal superregenerative receivers are not utilized, are employed in the present invention to provide a potential for controlling the amount of regeneration in valve 1. Such components are fed by way of condenser 21 to amplifier valve 23 by which all, except those at or in the vicinity of the quenching frequency, are amplified. The quenching frequency components are not appreciably amplified owing to the selective degeneration afforded by the tuned circuit 25, 26.

The resultant output signal obtained across the anode load resistor 29 is then rectified by the diode valve 30 so as to develop across the load resistor 38, a potential whose value is proportional to the mean amplitude of the noise fluctuations in the circuit of valve 1. This potential, which is negative at the anode end of resistor 38, is smoothed in the circuit of condensers 39, 41 and resistor 34 and is applied between the control grid and cathode of valve 36. The value of this potential is arranged, through appropriate selection of the circuit elements and operating potentials, to be insufficient to cut off the space current in the valve 36. As a result of this applied grid cathode potential, which varies as the noise level varies, there is a varying space current flowing through valve 36. This gives rise to a varying cathode potential which is positive relative to the earthed HT— line. This potential which is transferred to the control grid of superregenerative valve 1 is, of course, counterbiased by the potential drop in resistor 3 of the latter valve whereby the net bias on the control grid 12 is negative. A more negative voltage on the control grid 35 of valve 36 produces a similarly more negative, i. e. less positive, potential at the cathode 40 and vice versa. This cathode voltage, on application to the control grid 12, causes a similar variation of bias voltage of the valve 1 serving to control the degree of regeneration.

Assuming, for instance, that, under no-input signal conditions, the superregenerative valve 1 becomes more sensitive than the chosen optimum operating condition, due for instance to a change in the tuning frequency of circuit 6, 6a, then the amplitude of the noise voltages produced across load resistor 17 increases and these are applied to the amplifier valve 23 where amplification of all but the components in the vicinity of the quenching frequency is effected. These amplified oscillations, after rectification by diode valve 30, cause an increase in the negative potential at the anode end of load resistor 38. This increase is applied to the control grid of valve 36 and causes a decrease in the positive (with respect to earth) potential of the cathode end of load resistor 42. In consequence the positive bias potential applied to control grid 12 of superregenerative valve 1 is reduced with a resulting reduction of the sensitivity of the latter, thereby tending to restore the latter to its former optimum operating condition.

In the converse case where the sensitivity of the superregenerative valve 1 has decreased for some reason, the decreased amplitude of noise voltages across load resistor 17 gives rise to a corresponding decrease in the amplified signal components applied to diode 30 with a consequent reduction in the negative potential applied to the control grid of valve 36. The potential of the cathode of the latter thereupon rises and results in an increase of the positive potential applied to the control grid of superregenerative valve 1, again tending to restore the latter to its chosen optimum operating condition.

Under conditions when an input signal, for instance, a continuous wave signal, is applied to the valve 1, the signal component at quenching frequency occurring across the load resistor 17 is increased in amplitude relatively to the remaining random noise frequencies. If such component were appreciably amplified by the valve 23 and subsequently rectified by the diode 30, it would result in a decreased positive bias being applied to the valve 1 with a consequent lowering of receiver sensitivity. This undesirable result is avoided however by the selective degeneration afforded by the circuit 25, 26 whereby the amplifier valve 23 has little or no gain at the quenching frequency. The resulting reduction in sensitivity due to an applied signal is accordingly small.

The necessary regeneration control potential may be obtained and applied in a number of ways. For example, as shown in Fig. 2, diode valve 30 may be inverted whereby a positive potential is developed at what is now the cathode end of load resistor 38 by the noise voltages. The voltage across this load resistor is applied as before between the control grid and cathode of valve 36 in series with an opposing bias voltage provided by a battery 44. In this modification the previous connection, shown in Fig. 1, from the cathode 40 of amplifier valve 36 through resistor 43 to the radio-frequency choke 11 is omitted, and, instead, a connection is made from the lower potential end of resistor 38 to the cathode of the superregenerative valve 1 The previous bias resistor 3 and decoupling condenser 4 of this valve are omitted. The grid 12 of valve 1 is returned to earth through choke 11 in series with a suitable grid leak. The remainder of the circuit is as shown in Fig. 1

In operation, a mean direct current is developed across load resistor 38, as before, and the resulting positive potential across this resistor is applied as a bias to the grid 35 of valve 36. This potential is thus in opposition to the fixed bias due to battery 44, the potential of which has a value such that the net potential on the grid is negative when the receiver is adjusted to be in its most sensitive condition.

An increase in sensitivity due, for example, to a change in the tuning frequency, causes an increase in the potential developed across resistor 38 as before, and thus grid 35 becomes more positive and the potential developed across resistor 42 increases. Since cathode 2 of valve 1 is earthed through bias resistor 42, and grid 12 through the grid leak, the negative bias effective between control grid and cathode of valve 1 is increased and the sensitivity is restored towards its former value.

Yet a further embodiment of the invention is illustrated in Fig. 3, which shows a further modified form of the circuits of valves 23, 30 and 36. The remainder of the circuit is as described with reference to Fig. 1 with the exceptions that the resistor 43 is connected directly to the earthed HT— line instead of to cathode 40 of valve 36 while the lead from the positive pole of the high-tension supply to the mid-point 6' of the tuning coil 6 is omitted and the mid-point 6' is connected instead to the anode of amplifier valve 36.

Anode 27 of valve 23 is connected through condenser 31 to anode 33 of diode valve 30, the latter electrode being joined by resistor 32 to the negative pole of a bias battery 44, the positive pole of which is connected to the negative high-tension supply line. The cathode 29 of valve 30 is also joined through load resistor 38 to the negative pole of battery 44 and a condenser 39 is provided across the resistor as before. The cathode 29 of valve 30 is joined by way of a smoothing resistor 34 to grid 35 of valve 36, which grid is connected through condenser 41 to the cathode 40 of valve 36, which is connected direct to the negative high-tension supply line. The positive pole of the high-tension supply is connected by way of a resistor 45 to the anode of valve 36.

In operation, the existence of random noise fluctuations causes a positive bias potential to be applied to the control grid 35 of valve 36. This bias potential is opposed by that due to battery 44 and for high sensitivity the net bias potential is negative. A decrease in the mean amplitude of the random noise-voltage fluctuations causes grid 35 to become more negative, thus decreasing the anode current through valve 36 and lowering the potential drop across resistor 45. Thus the value of the high-tension voltage applied to the anode of valve 1 in the superregenerative amplifier stage is increased and the sensitivity restored. Where the regenerator valve 1 is a tetrode or pentode, variations in the screen grid potential, obtained by connecting that electrode to the anode of valve 36, may be relied on for a sensitivity control of the type just described.

In accordance with another embodiment of the invention, shown in Fig. 4, the quench-frequency oscillator 7 is joined by way of resistor 9, blocking condenser 10 and radio-frequency choke 11 to the control grid 47 of a pentode valve 48, which replaces triode valve 1 in the superregenerative amplifier stage previously described. The latter stage is shown as a Hartley-type oscillator, but it may be an oscillator of any other form. The control grid 47, which is connected to earth by way of a grid-leak resistor, is also connected through blocking condenser 13' to diode detector 15 which feeds an audio-frequency amplifier 19 and a pentode amplifier valve 23 as before. The circuits associated with the control grid and anode of valve 23 are also as previously described.

The amplified voltages developed across resistor 28 in the output of valve 23 are applied by way of condenser 31 to cathode 29 of valve 30 whose anode 33 is connected to cathode 29 by way of load resistor 38 and input resistor 32. Anode 33 is also connected by way of a smoothing resistor 34 to the suppressor grid 49 of pentode valve 48. Resistor 38 is shunted by condenser 39 and the ends of both these components remote from anode 33 are connected to the negative pole of the high-tension supply by way of condenser 46.

A potentiometer 50 is provided, connected at one end to the positive pole of the source of high tension and at the other end to the cathode of pentode valve 48. This latter end is also connected through a smoothing condenser 51 to the suppressor grid 49. An adjustable tap 52 on this potentiometer is connected to the end of resistor 32 remote from resistor 38.

In operation, random noise-voltage fluctuations cause the development of a potential across resistor 38 as before which potential is then applied as negative bias potential, by way of smoothing resistor 34, to the suppressor grid 49 of valve 48. This bias potential is opposed by a positive potential due to the voltage drop in the part of potentiometer 50 between tapping point 52 and the end of the potentiometer connected to the cathode of valve 48. The adjustments are such that for optimum sensitivity the net bias is negative. Then, as the sensitivity decreases, the bias potential is altered and conditions are restored.

It will be realized that in any arrangement according to the invention, the reduction in sensitivity due to any incoming continuous wave signal is small. If the gain of the amplifier comprising valves 23, 30 and 36 and their associated circuits is made too small for inputs at quench frequency, the effect of the incoming continuous wave signal on the sensitivity is very small and the continuous wage signal may be sufficient to cause sustained self-oscillation of the superregenerative amplifier. It is therefore desirable that the rejection of quench-frequency components by the amplifier 23 should be controllable in extent so that an incoming continuous wave signal produces a finite reduction in sensitivity sufficient only to prevent sustained self-oscillation of the superregenerative amplifier.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A wave-signal translating system comprising: a superregenerative oscillatory circuit, including quench-voltage supply means providing a quench signal having a preselected quench frequency, effective to produce an output signal which inherently contains noise-voltage fluctuation components occurring within a frequency band including said quench frequency and which has an amplitude determined by an operating characteristic of said circuit; a rectifying system for developing a control potential by rectification of said output signal; a frequency-selective coupler, comprising an amplifier having a cathode for amplifying frequencies within said band including a resonant cathode circuit so proportioned as to cause said amplifier to be degenerative at said quench frequency, coupling said rectifying system to said oscillatory circuit to apply said output signal to said rectifying system substantially free of any quench-frequency component; and means responsive to said control potential for controlling said operating characteristic of said oscillatory circuit.

2. A wave-signal translating system comprising: a superregenerative oscillatory circuit, including quench-voltage supply means providing a quench signal having a preselected quench frequency, effective to produce an output signal which inherently contains noise-voltage fluctuation components occurring within a frequency band including said quench frequency and which has an amplitude determined by an operating characteristic of said circuit; a rectifying system for developing a control potential by rectification of said output signal; a frequency-selective coupler, comprising an amplifier for amplifying frequencies within said band but having a degenerative feed-back path tuned to said quench frequency, coupling said rectifying system to said oscillatory circuit to apply said output signal to said rectifying system substantially free of any quench-frequency component; and means responsive to said control potential for controlling said operating characteristic of said oscillatory circuit.

3. A wave-signal translating system comprising: a superregenerative oscillatory circuit, including an electron-discharge device, including quench-voltage supply means providing a quench signal having a preselected quench frequency, and being effective to produce an output signal which inherently contains noise-voltage fluctuation components occurring within a frequency band including said quench frequency and which has an amplitude determined by an operating characteristic of said circuit; a rectifying system for developing a control potential by rectification of said output signal; a frequency-selective coupler, including a parallel-resonant circuit so proportioned as to afford substantial attenuation at said quench frequency, coupling said rectifying system to said oscillatory circuit to apply said output signal to said rectifying system substantially free of any quench-frequency component; and means for applying said control potential to said electron-discharge device to vary the degree of regeneration in said oscillatory circuit and control said operating characteristic thereof.

4. A wave-signal translating system comprising: a superregenerative oscillatory circuit, including an electron-discharge device, including quench-voltage supply means providing a quench signal having a preselected quench frequency, and being effective to produce an output signal which inherently contains noise-voltage fluctuation components occurring within a frequency band including said quench frequency and which has a amplitude determined by an operating characteristic of said circuit; a rectifying system for developing a control potential by rectification of said output signal; a frequency-selective coupler, including a resonant circuit so proportioned as to afford substantial attenuation at said quench frequency, coupling said rectifying system to said oscillatory circuit to apply said output signal to said rectifying system substantially free of any quench-frequency component; and a cathode-output signal repeater connected between said rectifying system and said oscillatory circuit to apply said control potential to said electron-discharge device to vary the degree of regeneration in said oscillatory circuit and control said operating characteristic thereof.

5. A wave-signal translating system comprising: a superregenerative oscillatory circuit including an electron-discharge device having anode, cathode, and control electrodes and including quench-voltage supply means providing a quench signal having a preselected quench frequency and being effective to produce an output signal which inherently contains noise-voltage fluctuation components occurring within a frequency band including said quench frequency and which has an amplitude determined by an operating characteristic of said circuit; a rectifying system for developing a control potential by rectification of said output signal; a frequency-selective coupler, including a parallel-resonant circuit so proportioned as to afford substantial attenuation at said quench frequency, coupling said rectifying system to said oscillatory circuit to apply said output signal to said rectifying system substantially free of any quench-frequency component; and means for applying said control potential to one of said electrodes of said electron-discharge device to vary the degree of regeneration in said oscillatory circuit and control said operating characteristic.

6. A wave-signal translating system comprising: a superregenerative oscillatory circuit including quench-voltage supply means providing a quench signal having a preselected quench frequency and being effective to produce an output signal which inherently contains noise-voltage fluctuation components occurring within a frequency band including said quench frequency and which has an amplitude determined by an operating characteristic of said circuit; said circuit including an electron-discharge device having anode, cathode, and control electrodes; a rectifying system for developing a control potential by rectification of said output signal; a frequency-selective coupler, including a resonant circuit so proportioned as to afford substantial attenuation at said quench frequency, coupling said rectifying system to said oscillatory circuit to apply said output signal to said rectifying system substantially free of any quench-frequency component; and means for utilizing said control potential to determine the magnitude of the anode-cathode potential of said electron-discharge device to control said operating characteristic of said oscillatory circuit.

7. A wave-signal translating system comprising: a superregenerative oscillatory circuit including an electron-discharge device having anode, cathode, and at least two control electrodes and including quench-voltage supply means providing a quench signal having a preselected quench frequency and being effective to produce an output signal which inherently contains noise-voltage fluctuation components occuring within a frequency band including said quench frequency and which has an amplitude determined by an operating characteristic of said circuit; a rectifying system for developing a control potential by rectification of said output signal; a frequency-selective coupler, including a parallel-resonant circuit so proportioned as to afford substantial attenuation at said quench frequency, coupling said rectifying system to said oscillatory circuit to apply said output signal to said rectifying system substantially free of any quench-frequency component; and means for applying said control potential to one of said electrodes of said electron-discharge device to vary the degree of regeneration in said oscillatory circuit and control said operating characteristic.

8. A wave-signal translating system comprising: a superregenerative oscillatory circuit including an electron-discharge device of the pentode type having a suppressor electrode and including quench-voltage supply means providing a quench signal having a preselected quench frequency and being effective to produce an output signal which inherently contains noise-voltage fluctuation components occurring within a frequency band including said quench frequency and which has an amplitude determined by an operating characteristic of said circuit; a rectifying system for developing a control potential by rectification of said output signal; a frequency-selective coupler, comprising an amplifier having a cathode for amplifying frequencies within said band including a resonant cathode circuit so proportioned as to cause said amplifier to be degenerative at said quench frequency, coupling said rectifying system to said oscillatory circuit to apply said output signal to said rectifying system substantially free of any quench-frequency component; and means for utilizing said control potential to determine the operating bias of said suppressor electrode of said electron-discharge device to control said operating characteristic of said oscillatory circuit.

HUBERT WOOD.
FREDERIC C. WILLIAMS.
JAMES RENNIE WHITEHEAD.

REFERENCES CITED

The following references are of record in the file of this patent:

UNITED STATES PATENTS

| Number | Name | Date |
|---|---|---|
| 2,398,214 | Emerson | Apr. 9, 1946 |
| 2,429,513 | Hansen et al. | Oct. 21, 1947 |
| 2,460,202 | Tyson | Jan. 25, 1949 |
| 2,501,186 | Okrent | Mar. 21, 1950 |